June 22, 1965  TAKEO MIURA ETAL  3,191,017
ANALOG MULTIPLIER
Filed Sept. 11, 1962  2 Sheets-Sheet 1
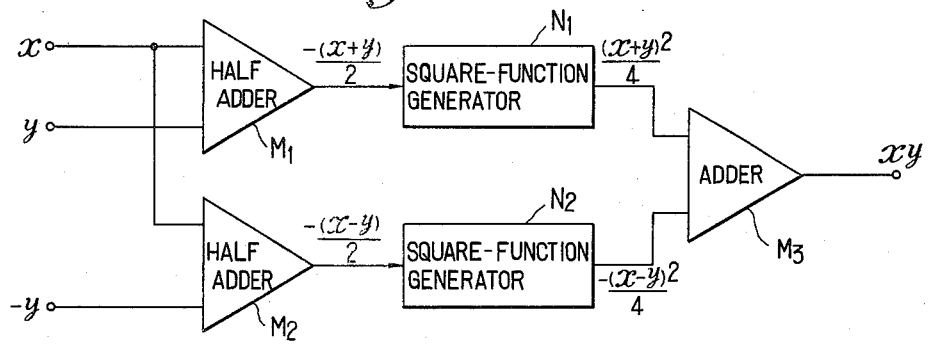
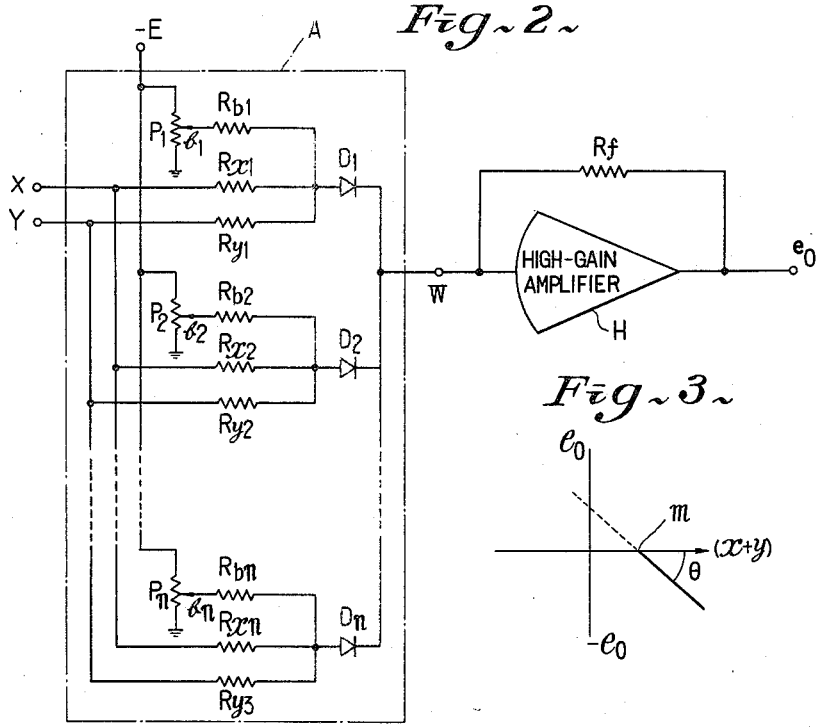
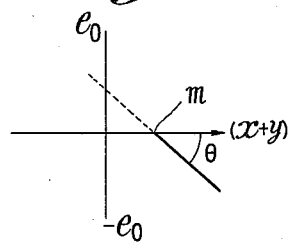

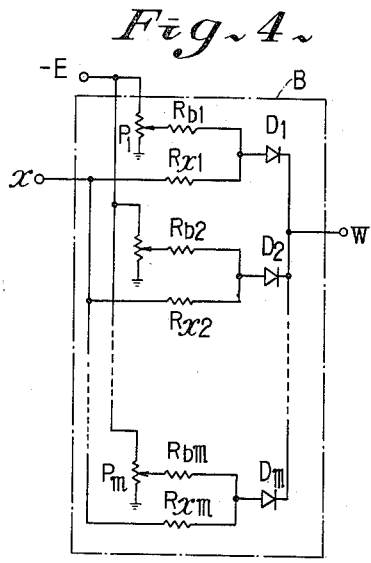
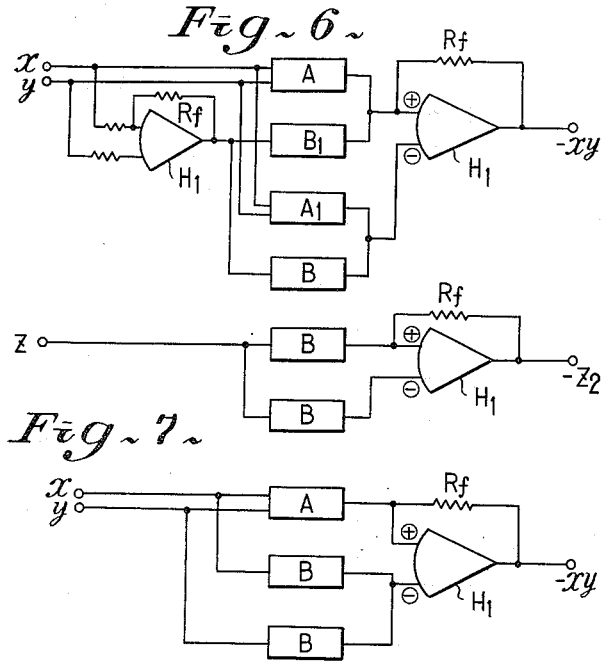
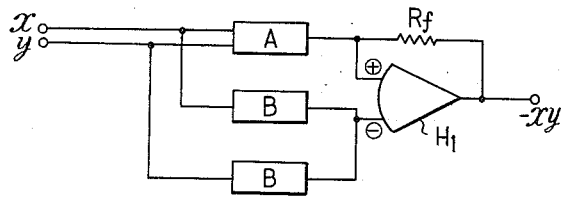
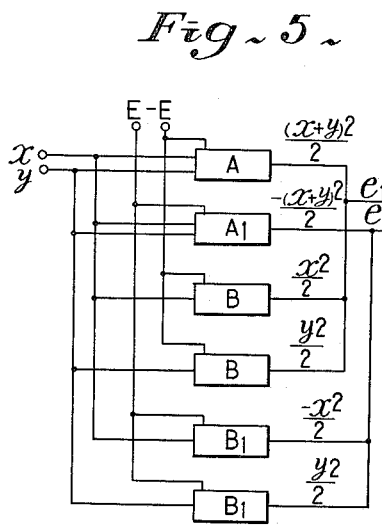
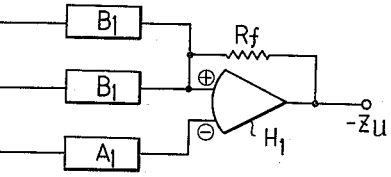
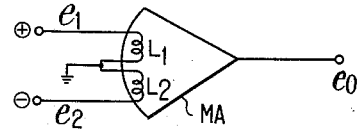

United States Patent Office 3,191,017
Patented June 22, 1965

3,191,017
ANALOG MULTIPLIER
Takeo Miura and Junzo Iwata, Kitatama-gun, Tokyo-to, Japan, assignors to Kabushiki Kaisha Hitachi Seisakusho, Tokyo-to, Japan, a joint-stock company of Japan
Filed Sept. 11, 1962, Ser. No. 222,878
6 Claims. (Cl. 235—194)

This invention relates to an electric adder which can be effectively used in analog computers using magnetic operational amplifiers.

The nature of the invention will be best understood with reference to the following description reference being made to the accompanying drawings in which like parts are designated by like reference letters, and in which:

FIG. 1 is a block diagram indicating the component arrangement of one example of a conventional four-quadrant multiplier;

FIG. 2 is an electrical circuit diagram showing an impedance circuit for use in the present invention;

FIG. 3 is a graphical representation indicating the relationship between output voltage $e_0$ and input signal $(x+y)$ and facilitating and understanding of the operation of the embodiment of FIG. 2;

FIG. 4 is an electrical circuit diagram showing an impedance circuit for a single input signal;

FIG. 5 is an electrical circuit diagram, in block form, indicating the component arrangement of a multiplier wherein impedance circuits according to the invention are used;

FIGS. 6 and 7 are block diagrams showing other circuit arrangements; and

FIG. 8 is a schematic diagram showing a magnetic amplifier for the function-generating circuit of the invention.

In general, a multiplier for generating a multiplied output $xy$ with respect to inputs $x$ and $y$ is so arranged that inputs $x, y$ and $x, -y$ are imparted, respectively, to half adders $N_1$ and $N_2$ as indicated in FIG. 1 on the basis of, for example, a relationship expressed by $$xy = \tfrac{1}{4}\{(x+y)^2 - (x-y)^2\} \quad (1)$$

to obtain outputs $$-\frac{(x+y)}{2} \text{ and } -\frac{(x-y)}{2}$$

at the half adders, then these outputs are applied further to square-function generators $N_1$ and $N_2$ to produce outputs $$\frac{(x+y)^2}{4} \text{ and } -\frac{(x-y)^2}{4}$$

which are then added in an adder $N_3$ to obtain the output $xy$.

It is an object of the present invention to provide a new electric multiplier of the character described, the construction of which is simplified by use of the relationship, $$xy = \tfrac{1}{2}\{(x+y)^2 - x^2 - y^2\}$$

The invention will now be described with respect to a particular embodiment thereof and a few applications thereof.

Referring to FIG. 2, the impedance circuit to be used in a multiplication circuit according to the invention comprises, essentially, an input impedance circuit, designated by the interrupted-line enclosure A, connected to a high-gain operational amplifier H and a feedback resistance $R_f$. The circuit A has a plurality of diodes $D_1, D_2 \ldots D_n$, and equal number of first input resistances $R_{b_1}, R_{b_2} \ldots R_{b_n}$, an equal number of second input resistances $R_{x_1}, R_{x_2} \ldots R_{x_n}$, and an equal number of third input resistances $R_{y_1}, R_{y_2} \ldots R_{y_n}$. These resistances are so connected that three kinds of the resistances $R_{b_p}, R_{x_p}$, and $R_{y_p}$ (where $p$ is 1, 2 ... or $n$) form one group with one end of each resistance in the group connected commonly to one terminal of a corresponding diode. The other ends of the resistance $R_{x_p}$ are connected to a common input terminal X; the other ends of the resistance $R_{y_p}$ are connected to a common input terminal Y; and the other ends of the resistances $R_{b_p}$ are connected to the output terminals of respective potentiometers $P_1, P_2 \ldots P_n$. The other ends of the diodes $D_1, D_2 \ldots D_n$ are connected to a common output terminal W tied to the amplifier H. A bias voltage $-E$ is impressed on the other terminals of each potentiometer. Reference symbols $b_1, b_2 \ldots b_n$ denote the output voltages of the aforesaid potentiometers $P_1, P_2 \ldots P_n$, that is, bias voltages impressed on the respective diodes by way of the first input resistances $R_{b_1}, R_{b_2} \ldots R_{b_n}$.

Such a circuit as described above (hereinafter referred to simply as circuit A) is connected, as an input impedance, to the input side of the high-gain amplifier H.

The case wherein, in the above circuit, input signals $x$ and $y$ are impressed on the two input terminals X and Y, and the said signals are imparted to the input side of the amplifier H through the circuit of only one group of the input resistances and a diode, for example, the circuit comprising resistances $R_{b_1}, R_{x_1}, R_{y_1}$, and the diode $D_1$, will now be considered. In this case, if $R_{x_1}$ is made equal to $R_{y_1}$, the output voltage $e_0$ can be expressed as follows:

$$e_0 = -R_f\left(\frac{x}{R_{x_1}} + \frac{y}{R_{y_1}} + \frac{b_1}{R_{b_1}}\right)$$

$$= -\frac{R_f}{R_{x_1}}(x+y) + \frac{R_f}{R_{b_1}}b_1 \quad (2)$$

In this case, however, since the diode $D_1$ is present, linear output voltage is produced only in the case of positive input signal $(x+y)$, that is, only in the negative region as indicated in FIG. 3.

The same result can be expected when the circuits of the other groups of resistances and diodes are each considered independently. Accordingly, the output voltage $e_0$ of the circuit illustrated in FIG. 2 can be made to have any output characteristic approximating a broken line with respect to an input signal $(x+y)>0$, if the inclination angle $\theta$ and the breakdown point $m$, etc., of the characteristic curve as shown in FIG. 3 of each group are set by suitably adjusting such factors as the bias voltage and input-resistance value of the group. For example, in order to obtain the squared characteristic $(x+y)^2$ with respect to the input $(x+y)$, the second and third input resistances $R_{x_1}, R_{x_2} \ldots R_{x_n}$ and $R_{y_1}, R_{y_2} \ldots R_{y_n}$ of the various groups are chosen to be respectively equal; the first input resistances $R_{b_1}, R_{b_2} \ldots R_{b_n}$ of the various groups are made to be of the same impedance; and, at the same time, the various bias voltages $b_1, b_2 \ldots b_n$ are set to be voltages at constant intervals in sequence.

Such a circuit as described above operates only when the sum of the two inputs is positive. However, a circuit wherein the connection directions of the diodes $D_1, D_2 \ldots D_n$ of the various groups are all selected so as to be of opposite polarity, and the bias voltage source $-E$ is selected to be E is capable of producing an output voltage for the case in which the sum of the two inputs is, conversely, negative. Such a circuit will be referred to hereinafter as $A_1$. That is, by using the above-said circuits A and $A_1$ in parallel arrangement and, moreover, connecting them so that the output due to the circuit A will be of a polarity opposite that due to the circuit $A_1$, it is possible to produce an output of $(x+y)^2$ throughout the region wherein the sum of the two inputs is positive and negative.

The circuit A shown in FIG. 2 is for two inputs. By removing the third input resistance from each group of this circuit A, an input-impedance circuit B as shown in FIG. 4 is obtained. This circuit B can be caused to be capable of producing, independently, a squared characteristic voltage approximating any broken line with respect to a positive input $x$ or $y$ by suitably determining the input resistance and or the bias voltage.

By reversing the connection directions of the various diodes of the circuit B of FIG. 4, and reversing the polarity of the bias voltage source thereof, a circuit $B_1$ which is capable of producing an output for one negative input is obtained.

By combining several impedance circuits having a squaring function as afore-described with a high-gain amplifier having a positive-input terminal $\oplus$ and a negative-input terminal $\ominus$, a multiplier of a simple construction can be formed. FIG. 5 shows an example of the multiplier obtained in accordance with the present invention. The said circuits are connected to a high-gain amplifier $H_1$ having a positive input terminal $\oplus$ and a negative input terminal $\ominus$. The negative input terminal $\ominus$ is an input terminal such as to cause the generation of an output of the same sign as the input when a certain input $e_2$ is impressed on the said terminal and equal to the output produced when the sign of the said input $e_2$ is changed, and the terminal has the same effect as an input $-e_2$ is applied to the positive input terminal $\oplus$. The positive input terminal $\oplus$ is an input terminal such that, as in an ordinary operational amplifier, an input $e_1$ imparted to the said terminal is amplified, and an output with changed sign is produced. That is, the operational amplifier $H_1$ produces an amplified output voltage $e_0$ of changed sign with respect to an input $e_1-e_2$.

A feedback impedance $R_f$ is connected across the input and output sides of the amplifier $H_1$ as in the case shown in FIG. 2. The multiplier illustrated in FIG. 5 functions on the basis of the following relationship.

$$xy = \tfrac{1}{2}\{(x+y)^2 - x^2 - y^2\} \quad (3)$$

The various values such as those of the resistances and bias voltages within the various circuits are so selected that the outputs of the circuits A and $A_1$ are $$\frac{(x+y)^2}{2}$$

and $$\frac{(x+y)^2}{2}$$

respectively; the circuits B and $B_1$ having $x$ as their input produce $$\frac{x^2}{2}$$

and $$-\frac{x^2}{2}$$

respectively; and the circuits B and $B_1$ having $y$ as their input produce $$\frac{y^2}{2}$$

and $$-\frac{y^2}{2}$$

respectively. These designations such as output $$\frac{(x+y)^2}{2}$$

$$\frac{x^2}{2}$$

ets., however, do not mean that voltages of the values $$\frac{(x+y)^2}{2}$$

$$\frac{x^2}{2}$$

etc., are actually produced at the designated points. What these designations indicate is that, in each case, when only the impedance of the pertinent circuit is connected as the input impedance of the operational amplifier having the feedback resistance $R_f$, and voltages $x$ and $y$ are imparted to the input terminals, the designated value, for example, $$\frac{(x+y)^2}{2}$$

is produced as the output of the said operational amplifier.

It will be apparent that when these various impedance circuits are connected as multiplication input impedances to the aforesaid terminals $\oplus$ and $\ominus$ of the operational amplifier $H_1$ on the basis of the above Equation 3, an output voltage $e_0 = -xy$ is produced. Since, in the multiplier of this system, the operation $(x+y)^2 - x^2 - y^2$ is effected in the amplifier $H_1$, the said multiplier is of simpler construction than that of the case shown in FIG. 1.

As indicated in FIG. 6, a plurality (three shown) of operational amplifiers $H_1$ can be used, whereby it becomes easily possible to cause the generation of a second-power output $-z^2$ with respect to another input $z$ simultaneously together with the multiplied output $-xy$ with respect to inputs $x$ and $y$.

In the case of single-polarity input signals, it is possible, by using two operational amplifiers $H_1$ as indicated in FIG. 7, to produce two kinds of multiplied outputs $xy$ and $zu$ with the same number of multiplication impedances.

While the adder of this invention is very convenient when the operational amplifier is provided with the circuit having a positive input terminal and a negative input terminal, a combination of a sign changer and an ordinary operational amplifier having only a positive input terminal may be used instead. However, since the use of an amplifier provided with both positive and negative inputs makes a sign changer unnecessary, the use of such an amplifier is more practical.

For this purpose, the present invention provides a magnetic operational amplifier which has been specially devised, and which will now be described with reference to FIG. 8. This amplifier consists essentially of a magnetic amplifier MA having two control windings $L_1$ and $L_2$ which are wound on an iron core in such a manner as to excite a mutual same magnetic path. The said windings $L_1$ and $L_2$ have terminals $\oplus$ and $\ominus$, respectively, and a common terminal which is grounded. The winding directions of these windings are such that, when voltages of the same polarity are impressed on the said terminals $\oplus$ and $\ominus$, the magnetic flux direction created by the current flowing through the winding $L_1$ and the magnetic flux direction created by the current flowing through the winding $L_2$ are mutually opposite.

Accordingly, an input $e_2$ imparted to the terminal $\ominus$ effects subtraction with respect to an input $e_1$ imparted to the terminal $\oplus$. That is, an output is, consequently, produced with respect to $(e_1-e_2)$ as was described hereinbefore.

When a magnetic amplifier of this nature is used as the afore-described high-gain amplifier $H_1$, the component arrangement becomes extremely simple. Moreover, since a triangular-shaped ripple current is contained in the output of the magnetic amplifier, the approximating characteristic curve becomes round according to approximated square function at the position near the turning point, whereby the number of approximating straight lines of the circuit having a square function is made few and the circuit is simplified.

In the foregoing explanation, the multiplier of the present invention as shown in FIG. 5 utilizes six impedance circuits in total so that the product of $x$ and $y$ can be obtained even if the two inputs $x$ and $y$ vary with positive and negative polarities. In this case, however, if the inputs $x$ and $y$ are restricted to a single polarity such as, for instance, positive polarity alone, it is possible to eliminate the impedance circuits $A_1$ and two circuits $B_1$.

Thus, the multiplier of FIG. 5 of the present invention is capable of obtaining the output resulted from the product of the inputs $x$ and $y$ by combining one operational amplifier with a plurality of impedance circuits having the squaring function. The conventionally known multipliers had to use more than two such operational amplifiers without exception. And, as the present invention specially utilizes magnetic operational amplifier input terminals, accuracy in the squaring function of the impedance circuit by the broken-line approximation becomes higher and the numbers of resistance and diode within said impedance circuits need not be many with the result that the circuit construction becomes extremely simple.

Although this invention has been described with respect to particular embodiments thereof, it is not to be so limited as changes and modifications may be made therein which are within the full intended scope of the invention, as defined by the appended claims.

What is claimed is:

1. A multiplier comprising summing-amplifier means having a pair of input terminals and adapted to produce an output signal proportional to the difference of the sums of input signals applied to each of said terminals; first input-impedance means connected to the terminals of said summing-amplifier means for applying thereto a signal proportional to the function $$\pm \frac{(x+y)^2}{2}$$

generated from a pair of signals respectively proportional to the variables $\pm x$ and $\pm y$, respectively, second input-impedance means connected to one of said terminals of said summing-amplifier means for applying thereto a signal proportional to the function $$\pm \frac{x^2}{2}$$

generated from said signal proportional to the variable $\pm x$; and third input-impedance means connected to one of said terminals of said summing-amplifier means for applying thereto a signal proportional to the function $$\pm \frac{y^2}{2}$$

generated from said signal proportional to the variable $y$ whereby said summing-amplifier means combines said functions according to the relationship $$\frac{(x+y)^2}{2} - \frac{x^2}{2} - \frac{y^2}{2}$$

so that said output signal is proportional to the product $xy$ of said variables.

2. A multiplier comprising magnetic summing-amplifier means having a pair of flux-opposed control windings energizable by respective input signals and having respective input terminals for producing an output signal determined by the subtractive combination of the input signals and proportional to the difference of the sums of input signals applied to each of said terminals; first input-impedance means connected to one of said terminals of said summing-amplifier means for applying thereto a signal proportional to the function $$\pm \frac{(x+y)^2}{2}$$

generated from a pair of signals respectively proportional to the variables $\pm x$ and $\pm y$, respectively, said first input-impedance means including a square-function generating network responsive to said signals respectively proportional to said variables $x$ and $y$, said network comprising a multiplicity of diodes having corresponding output sides connected in parallel to the corresponding terminal of said summing-amplifier means, first, second and third resistor means connected in parallel to corresponding input sides of each diode, all of said second resistor means of each of said networks being concurrently energized by said signal proportional to said variable $x$, all of said third resistor means being of an ohmic resistance equal to that of the respective second resistor means while being concurrently energized by said signal proportional to said variable $y$, all of said first resistor means having substantially identical ohmic resistance, and biasing means for applying to successive ones of said first resistor means biasing potentials of stepped magnitudes at a substantially constant potential increment; second input-impedance means connected to one of said terminals of said summing-amplifier means for applying thereto a signal proportional to the function $$\pm \frac{x^2}{2}$$

generated from said signal proportional to the variable $\pm$; and third input-impedance means connected to one of said terminals of said summing-amplifier means for applying thereto a signal proportional to the function $$\pm \frac{y^2}{2}$$

generated from said signal proportional to the variable $y$ whereby said summing-amplifier means combines said functions according to the relationship $$\frac{(x+y)^2}{2} - \frac{x^2}{2} - \frac{y^2}{2}$$

so that said output signal is proportional to the product $xy$ of said variables.

3. A multiplier comprising magnetic summing-amplifier means having a pair of flux-opposed control windings energizable by respective input signals and having respective input terminals for producing an output signal determined by the subtractive combination of the input signals and proportional to the difference of the sums of input signals applied to each of said terminals; first input-impedance means connected to one of said terminals of said summing-amplifier means for applying thereto a signal proportional to the function $$\pm \frac{(x+y)^2}{2}$$

generated from a pair of signals respectively proportional to the variables $\pm x$ and $\pm y$, respectively, said first input-impedance means including a positive square function generating network connected to one of said terminals and responsive to said signals respectively proportional to said variables $x$ and $y$ when they are of like polarity and a negative square-function generating network connected to the other of said terminals and responsive to said signals respectively proportional to said variables $x$ and $y$ when they are of opposite polarity, each of said networks comprising a multiplicity of diodes having corresponding output sides connected in parallel to the corresponding terminal of said summing-amplifier means, first, second and third resistor means connected in parallel to corresponding input sides of each diode, all of said second resistor means of each of said networks being concurrently energized by said signal proportional to said variable $x$, all of said third resistor means being of an ohmic resistance equal to that of the respective second resistor means while being concurrently energized by said signal proportional to said variable $y$, all of said first resistor means having substantially identical ohmic resistance, and biasing means for applying to successive ones of said first resistor means biasing potentials of stepped magnitudes at a substantially constant potential increment, said negative network having its said diodes poled opposite the diode polarity of said positive network and biasing potentials of a polarity opposite that of the biasing potentials of said positive network; second input-impedance means connected to one of said terminals of said summing-amplifier means for applying thereto a signal proportion to the function $$\pm \frac{x^2}{2}$$

generated from said signal proportional to the variable $\pm x$; and third input-impedance means connected to one of said terminals of said summing-amplifier means for applying thereto a signal proportional to the function $$\pm \frac{y^2}{2}$$

generated from said signal proportional to the variable $y$ whereby said summing-amplifier means combines said functions according to the relationship $$\frac{(x+y)^2}{2} - \frac{x^2}{2} - \frac{y^2}{2}$$

so that said output signal is proportional to the product $xy$ of said variables.

4. A multiplier comprising magnetic summing-amplifier means having a pair of flux-opposed control windings energizable by respective input signals and having respective input terminals for producing an output signal determined by the subtractive combination of the input signals and proportional to the difference of the sums of input signals applied to each of said terminals; first input-impedance means connected to one of said terminals of said summing-amplifier means for applying thereto a signal proportional to the function $$\pm \frac{(x+y)^2}{2}$$

generated from a pair of signals respectively proportional to the variables $\pm x$ and $\pm y$, respectively, said first input-impedance means including a positive square-function generating network connected to one of said terminals and responsive to said signals respectively proportional to said variables $x$ and $y$ when they are of like polarity and a negative square-function generating network connected to the other of said terminals and responsive to said signals respectively proportional to said variables $x$ and $y$ when they are of opposite polarity, each of said networks comprising a multiplicity of diodes having corresponding output sides connected in parallel to the corresponding terminal of said summing-amplifier means, first, second and third resistor means connected in parallel to corresponding input sides of each diode, all of said second resistor means of each of said networks being concurrently energized by said signal proportional to said variable $x$, all of said third resistor means being of an ohmic resistance equal to that of the respective second resistor means while being concurrently energized by said signal proportional to said variable $y$, all of said first resistor means having substantially identical ohmic resistance, and biasing means for applying to successive ones of said first resistor means biasing potentials of stepped magnitudes at a substantially constant potential increment, said negative network having its said diodes poled opposite the diode polarity of said positive network and biasing potentials of a polarity opposite that of the biasing potentials of said positive network; second input-impedance means connected to one of said terminals of said summing-amplifier means for applying thereto a signal proportional to the function $$\pm \frac{x^2}{2}$$

generated from said signal proportional to the variable $\pm x$; and third input-impedance means connected to one of said terminals of said summing-amplifier means for applying thereto a signal proportional to the function $$\pm \frac{y^2}{2}$$

generated from said signal proportional to the variable $y$ whereby said summing-amplifier means combines said functions according to the relationship $$\frac{(x+y)^2}{2} - \frac{x^2}{2} - \frac{y^2}{2}$$

so that said output signal is proportional to the product $xy$ of said variables, said second and third input-impedance means each including a respective positive square function generating network connected to said one of said terminals and responsive to a signal respectively proportional to said variables $x$ and $y$ when it is positive and a respective negative square-function generating network connected to said other of said terminals and responsive to a signal respectively proportional to said variables $x$ and $y$ when it is negative, each of said networks of said second and third input-impedance means comprising a multiplicity of diodes having corresponding output sides connected in parallel to the corresponding terminal of said summing-amplifier means, first and second resistor means connected in parallel to corresponding input sides of each diode, all of said second resistor means of each of said networks of said second input-impedance means being concurrently energized by said signal proportional to said variable $x$, all of said second resistor means of each of said networks of said third input-impedance means being concurrently energized by said signal proportional to said variable $y$, all of said first resistor means of each input-impedance means having substantially identical ohmic resistance, and respective biasing means for applying to successive ones of said first resistor means of each input-impedance means biasing potentials of stepped magnitudes at a substantially constant potential increment, said negative network of each input-impedance means having its said diodes poled opposite the diode polarity of the corresponding positive network and biasing potentials of a polarity opposite that of the biasing potentials of said corresponding positive network.

5. An analog electric multiplier comprising at least two control windings having a common exciting magnetic path and provided respectively with first and second input terminals through which input signals are respectively impressible upon said control windings; a magnetic amplifier energized by said control windings such that a difference signal resulting from the respective input signals impressed on each of the said first and second input terminals is produced at an output terminal of said magnetic amplifier; a first broken-line-approximation impedance circuit connected with said first input terminal for producing an output proportional to $(x+y)^2$ from two input signals $x$ and $y$; a second broken-line-approximation impedance circuit connected with said second input terminal for producing from said input signal $x$ an output proportional to $x^2$; and a third broken-line-approximation impedance circuit connected with said second input terminal for producing from said input signal $y$ an output proportional to $y^2$ whereby multiplication output $xy$ is obtained at said output terminal of the said magnetic amplifier in accordance with the relationship $$xy = \tfrac{1}{2}\{(x+y)^2 - x^2 - y^2\}$$

6. An electric analog multiplier comprising at least two control windings having a common exciting magnetic path and provided respectively with first and second input terminals through which input signals are respectively impressible upon said control windings; a magnetic amplifier energized by said control windings such that a difference signal resulting from the respective input signals impressed upon the said first and second input terminals is produced at an output terminal of said magnetic amplifier; means for negative feedback of the output of said magnetic amplifier to an input terminal thereof; a broken-line-approximation impedance circuit connected with said first input terminal which produces from input signals $x$ and $y$ an output proportional to $$\frac{(x+y)^2}{2}$$

when $(x+y)<0$; a broken-line-approximation impedance circuit connected with said second input terminal for producing from said signal $x$ an output proportional to $$\frac{x^2}{2}$$

when $x>0$; a broken-line-approximation impedance circuit connected with said first input terminal for producing an output proportional to $$-\frac{x^2}{2}$$

when $x>0$; a broken-line-approximation impedance circuit connected with said second input terminal for producing an output proportional to $$\frac{y^2}{2}$$

when $y>0$; and a broken-line-approximation impedance circuit connected with said first input terminal for producing an output proportional to $$-\frac{y^2}{2}$$

when $y<0$ whereby multiplication output is obtained at the output terminal of said magnetic amplifier in accordance with the following relationship $$xy=\tfrac{1}{2}\{(x+y)^2-x^2-y^2\}$$

References Cited by the Examiner

Pages 222–228 [235–194], June 1959, Paul E. Pfeiffer "A Four-Quadrant Multiplier Using Triangler Waves, Diodes, Resistors, and Operational Amplifiers," IRE Transactions on Electronic Computers.

Pages 134–135 [330–8], March 13, 1959, Samuel Davis, "Magnetic Amplifiers for Servo Systems," Electronics.

MALCOLM A. MORRISON, *Primary Examiner.*